(No Model.) 2 Sheets—Sheet 1.

B. TUPHOLME.
COFFEE ROASTER.

No. 558,123. Patented Apr. 14, 1896.

(No Model.) 2 Sheets—Sheet 2.
B. TUPHOLME.
COFFEE ROASTER.
No. 558,123. Patented Apr. 14, 1896.
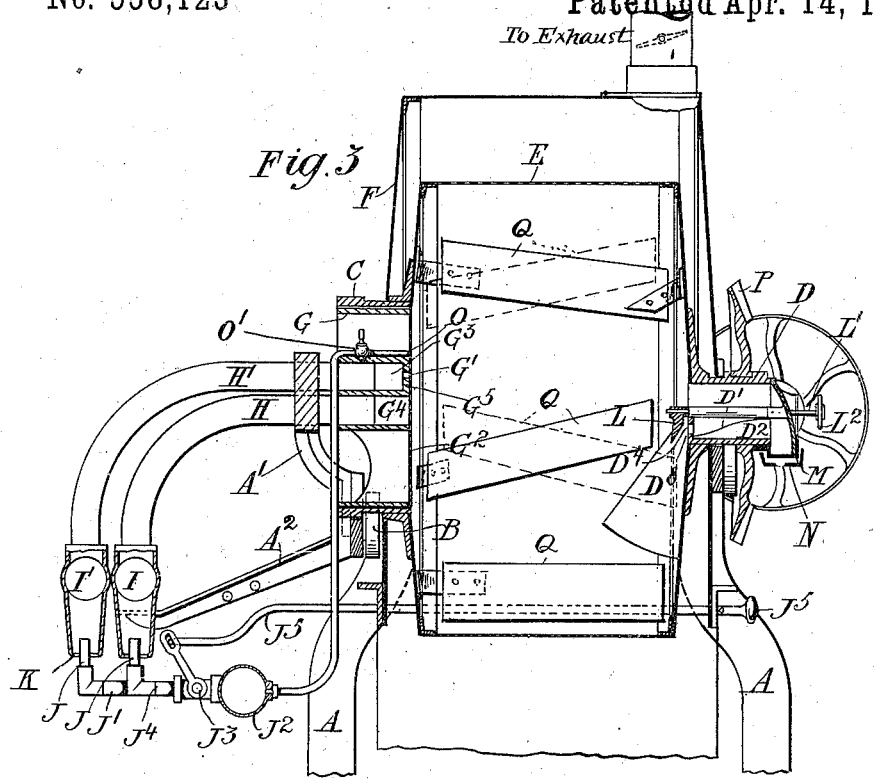
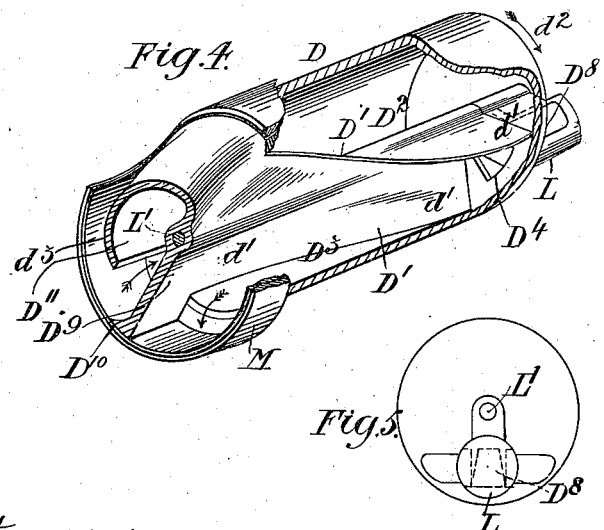

UNITED STATES PATENT OFFICE.

BEESTON TUPHOLME, OF LONDON, ENGLAND, ASSIGNOR TO JOSEPH BAKER & SONS, OF SAME PLACE.

COFFEE-ROASTER.

SPECIFICATION forming part of Letters Patent No. 558,123, dated April 14, 1896.

Application filed September 26, 1895. Serial No. 563,743. (No model.) Patented in England April 4, 1887, No. 4,970.

*To all whom it may concern:*

Be it known that I, BEESTON TUPHOLME, a subject of the Queen of England, residing at London, England, have invented certain new and useful Improvements in Coffee or Like Roasters, (for which I have obtained Letters Patent in Great Britain, No. 4,970, dated April 4, 1887,) of which the following is a specification.

This invention has for its object to construct a coffee or like roaster so that the roasting may be effected by gas-flame the shape of which may be varied to suit the different stages of roasting of the berries, and, further, to provide the roaster with a sampler which shall automatically and continuously bring to the exterior of the apparatus and again return to the interior thereof samples of the berries, so that the condition of the bulk may at any time be ascertained at a glance.

The invention will be best understood by reference to the accompanying drawings, in which—

Figure 1:
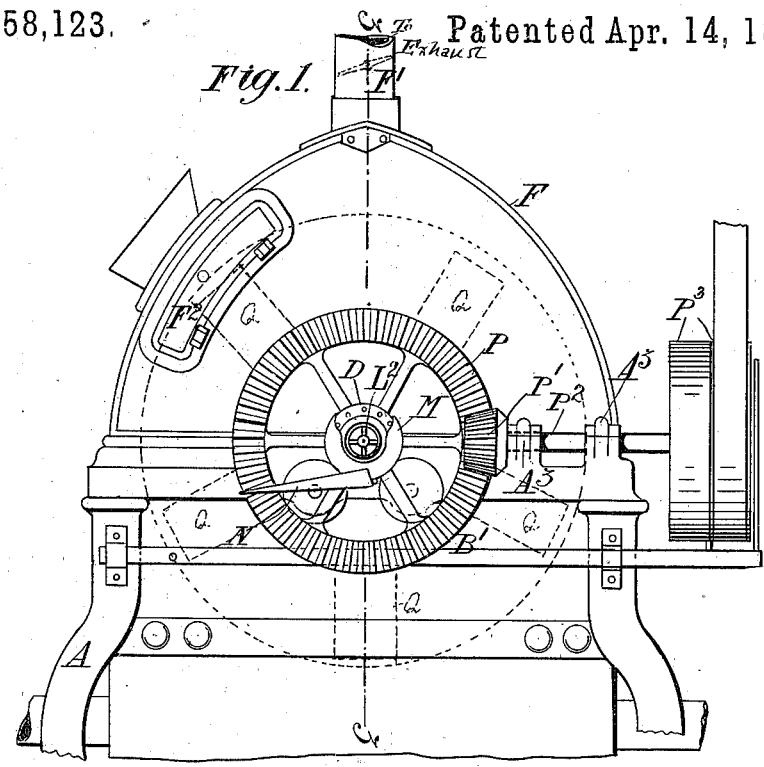
Figure 2:
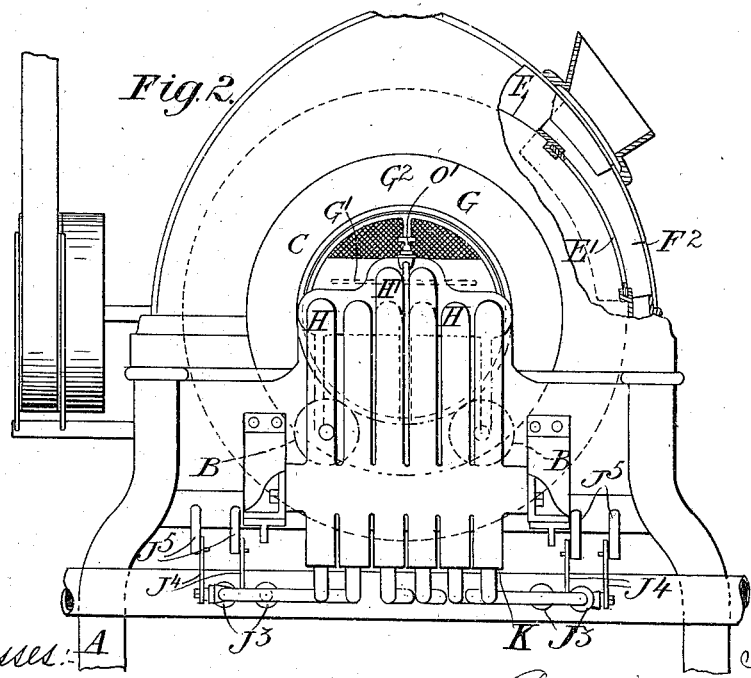

Figures 1 and 2 are elevations of respectively opposite sides of the upper part of a coffee-roaster constructed according to this invention, Fig. 1 showing the sampler and Fig. 2 (which is partly broken away) the arrangement of gas-burners. Fig. 3 is a section on line 3 3 of Fig. 1. Fig. 4 is a perspective view of the automatic sampler, part of which is broken away for convenience of illustrating portions which would otherwise be obscured. Fig. 5 is an elevation of the inner end of the sampler.

Like letters indicate like parts throughout the drawings.

A is a frame for supporting the various operative parts of the apparatus.

B B' are rollers on which are supported and free to rotate the hollow trunnions C D, respectively, of the roasting-drum E, whose cylindrical wall is formed of perforated sheet metal, wire-cloth, or other open-work. Outside of the drum E is provided a hood or cover F, suitably secured to the frame A and adapted to close in the whole of the upper part of the apparatus in order to carry away the heated gaseous and branny products resulting from the roasting process, the hood for this last-named purpose being provided with an outlet-pipe F', to which is connected a fan or other exhauster. (Not shown in the drawings.) The hood F is, moreover, provided with a door $F^2$, by opening which access may be had to the drum E to enable the preferably-sliding door E', Fig. 2, with which the latter is fitted, to be withdrawn or opened when it is desired to discharge the contents of the drum, a suitable chute, cooler, or other receptacle (not shown in the drawings) being placed beneath the drum for receiving the contents when thus discharged.

Within the hollow trunnion C is located a stationary frame G, in which are mounted the inner ends of the burner-pipes H H', and which may rely for its support either on the pipes H H', themselves suitably connected, as by a bracket A', to the frame A, or upon any other suitable bracket connected to the frame A. In the drawings there are represented six pipes H and two pipes H'; but these vary in number according to the capacity of each individual roasting-machine. The outer side of the frame G is left open and the inner side is closed by wire-gauze or other open-work $G^2$.

The burner-pipes H H' fit into sockets formed integral with the frame G, which may conveniently be a casting, the sockets constituting the inlets to the chambers $G^3$ $G^4$, Fig. 3, the former of which is partially closed by a wall $G^5$, (a portion of the aforesaid casting,) in which is provided a row of small holes or a narrow slot G', all as shown in Fig. 3. The back of the chamber $G^4$ is closed in merely by the wire-gauze $G^2$.

If desired, the inner ends of the six pipes H may abut directly against the gauze $G^2$ and the chamber $G^4$ be entirely dispensed with.

The outer ends of the burner-pipes H H' are respectively connected to mixing-chambers I I', to which are admitted gas through the nozzles J and air through the inlets K, which surround the nozzles. The mixing-chambers I are formed conveniently in one casting and the chambers I' in another, and these castings may be supported by one or more brackets $A^2$, secured to the frame A.

As shown, the gas-supply pipes conduct the gas into the interior of the drum at a point adjacent to the axial center of the latter, which arrangement I would prefer; but it will be understood that I am not restricted to the precise arrangement stated, as the pipes could be arranged to conduct the supply of gas to the drum at other points.

The nozzles J are provided on the outer ends of the branches J', connected with the main gas-supply pipe J². The supply of gas to the burner-pipes H H' may be controlled by cocks J³, of which there may be one to each branch J', or two or more of the branches may be connected together, so that each such combination may be controlled by one cock.

In Fig. 2 there are represented four cocks J³, which may be a convenient number in the arrangement illustrated, each cock being adapted to control the supply of gas to two of the jets J. The lever or handle J⁴ of each of the cocks J³ is pivoted to the back end of a rod J⁵, which is free to slide in the direction of its length in and extends to the front of the frame A, at which latter part it is provided with a knob or handle, whereby it may be conveniently operated for turning on and off the cock to which it is connected.

The interior of the hollow trunnion D is divided by a diaphragm D' into two separate channels D² D³, the inner end of the former of which is completely open to the interior of the drum A and the inner end of the latter closed except for an aperture D⁴, the effective size of which is controllable by means of a block or valve L, which may be adjusted by a screw-threaded spindle L' from the front of the machine, where it is provided with a handle or hand-wheel L². The valve L works within or forms an adjustable part of a chute or hopper D⁸, which guides the coffee-beans falling into it into the channel D³.

The diaphragm D' at its outer or front end may extend diametrically across the hollow trunnion D, so that the inlet end of the channel D² and the outlet end of the channel D³ will be of the same size; but as the diaphragm is to serve for moving the berries inward as well as outward its wings or conveyers d d' on opposite sides of its central or axial line are shaped to form parts of oppositely-directed helices. The directions in which the berries are caused to move by the action on them of the two wings d d' of the diaphragm are indicated by the arrows shown at the left of Fig. 4, the arrow d² at the right end of the figure indicating the direction of rotation of the trunnion D for obtaining this result. By the diaphragm being formed as last described the inlet end of the channel D³ is made smaller than the outlet end and the outlet end of the channel D² is made larger than the inlet end thereof. This, however, does not materially affect the working of the apparatus, or, if anything, provides a freer release of the berries from the two channels D² D³.

On the outer or front end of the hollow trunnion D is freely suspended a segmental trough M, which normally remains in the position in which it is shown in Figs. 1 and 3, whether the drum be rotating or not, and which may at any desired time be turned upon the trunnion D, so as to discharge its contents onto a stationary shelf N, Fig. 1, secured to any convenient part of the frame A or hood F.

If desired, a catch may be provided for securing the trough in its non-discharging position, this catch being released when it is required to discharge the contents of the trough onto the shelf N.

The channel D³ opens directly into the trough M, as shown in Fig. 4, and the wing or conveyer d' is extended, as at D⁹, across the trough and provided with a sharpened edge D¹⁰, adapted to rotate in contact with the inner surface of the trough M, which for this reason is preferably turned at this part to present a smooth surface. The diaphragm D⁹ and sharpened edge D¹⁰ constitute, virtually, a scoop, under which term D⁹ and D¹⁰ are hereinafter referred to as whole, the letter D⁹ being used to designate said scoop. Over or adjacent to the scoop D⁹ is provided a hood D¹¹, which, like the scoop, extends, preferably, completely across the trough and whose surface d³ is at such a distance away from the interior surface of the trough M as not to interfere with the coffee-beans, which are to be gathered together by the scoop D⁹. The hood D¹¹ is curved or inclined in such manner as to direct the coffee-beans which fall onto it from the scoop D⁹ into the channel D², of which the space between the scoop D⁹ and hood D¹¹ forms practically a continuation.

O is a pilot-burner connected with the gas-supply pipe J² and provided with a cock O' for controlling the supply of gas thereto. A pilot-light may be kept constantly burning at O, so as to ignite the gas which may be admitted through the burner-pipes H H'.

P is a bevel-toothed wheel rigid on the hollow trunnion D and geared with a bevel-pinion P', secured on a shaft P², which is supported in bearings A³ on the frame A. On the shaft P² are mounted fast and loose pulleys P³ or other devices wherewith to place the coffee-roaster in operative connection with a motor for rotating the drum. If desired, however, the drum may be rotated by hand instead of by power.

The operation of the roaster is as follows: When the charge of berries is first introduced into the drum E through the hopper or doors E' F² and the latter thereafter closed and the drum is rotated, the heating is effected by gas introduced through the burner-pipes H, any desired number of these being used, according to requirements. Toward the completion of the roasting process the supply of gas to the burner-pipes H is turned off, leaving on only the smaller thin flame emitted through the slot or row of holes G' to finish the roast. At each rotation of the drum E some of the coffee-berries are caught by or fall into the chute D⁸ and pass through the aperture D⁴ into the channel D³, through which, by reason of the direction of the twist of the conveyer d of the diaphragm D', they are caused to travel outward toward and into the trough M at the back of the scoop D⁹. The berries thus deposited in the trough M may be turned onto the shelf N by tilting the trough, as before described, and may be collected from time to time from the shelf for retaining as permanent samples or for replacing into the trough M, whence they are automatically returned into the drum E. If the trough M is not tilted from its normal position, the berries deposited therein at one rotation of the drum will be removed from the trough M by the scoop D⁹ at the next rotation and directed by the hood D¹¹ into the channel D², through which, by reason of the direction of the twist of the conveyer $d$ of the diaphragm D′, they will be caused to return into the drum E. By adjusting the position of the block or valve L by means of the screwed spindle L′ and hand-wheel L² the quantity of berries delivered into the trough M at each rotation of the drum may be increased or decreased, according to requirements. Suitable plates or vanes Q are fixed inside the drum E for the purpose of distributing and throwing the berries through the flame, also directing the berries toward the chute D⁸.

It will be noted that in my machine the coffee-berries are subjected to the direct action of a gas-flame, whereby I am enabled to roast in a much shorter period than with the usual class of roasting-machines, wherein the roasting-cylinder is heated externally and the berries are roasted by coming in contact with the heated cylinder. Thus I considerably increase the output of the machine, and besides, owing to the direct action of the flame upon the berries, avoid loss of the essence of the berries to a maximum extent.

I claim—

1. In a coffee-roasting machine the combination with a roasting-drum, of a hollow trunnion thereon, a helical conveyer and a channel within the trunnion, a trough into which said channel is adapted to discharge, said trough being adapted to be tilted, and a shelf adapted to receive the contents of the trough when the same is tilted, as specified.

2. In a coffee-roasting machine, the combination with a roasting-drum, and a hollow trunnion thereon, of two helical conveyers of opposite inclination and two separate channels in the said trunnion and a trough into which one of the channels is adapted to discharge, and a scoop and hood for the other channel for the purpose specified.

3. In a coffee-roasting machine, the combination with a roasting-drum, of a hollow trunnion thereon, two helical conveyers of opposite inclination and two separate channels in the trunnion, a valve for one of the channels, and a trough into which said channel is adapted to discharge and a scoop and hood for the other channel for the purpose specified.

4. In a coffee-roasting machine, the combination with a roasting-drum, of means operating to automatically collect a portion of the contents of the drum at intervals during the rotation of the drum and discharge said contents exteriorly of the drum, as specified.

5. In a coffee-roasting machine the combination with a drum hollow trunnion on the drum and a supporting-frame, of two helical conveyers of opposite inclination and two separate channels in the trunnion, a trough, an outlet for one channel into the trough, and a scoop and hood for the other channel, substantially as set forth.

6. In a coffee-roasting machine the combination with an open-work drum hollow trunnions on the drum and a frame for supporting the trunnions of two helical conveyers of opposite inclination and two separate channels in one of the trunnions a trough on the trunnion a valve and an outlet into the trough for one channel a screwed spindle in operative connection with the valve and a scoop and hood for the other channel substantially as set forth.

7. In a coffee-roasting machine the combination with an open-work drum, hollow trunnions on the drum, and a frame for supporting the trunnions, of a fixed frame within one of the trunnions, sockets in the frame, burner-pipes in the sockets in connection with a source of gas-supply, open-work in front of the fixed frame, and a slot or row of holes behind the gauze, substantially as set forth.

In testimony whereof I have hereto set my hand in the presence of the two subscribing witnesses.

BEESTON TUPHOLME.

Witnesses:
T. SMITH,
P. WALKEY.